United States Patent Office 3,056,722
Patented Oct. 2, 1962

3,056,722
ENDRIN INSECTICIDE CONCENTRATE COMPOSITIONS
Leo Trademan and Sidney Katz, Chicago, and Erik R. Nielsen, Des Plaines, Ill., assignors, by direct and mesne assignments, to Velsicol Chemical Corporation, Chicago, Ill., a corporation of Illinois
No Drawing. Filed Nov. 29, 1957, Ser. No. 699,496
7 Claims. (Cl. 167—33)

This invention relates to new compositions of the insecticide endrin. More specifically, it relates to compositions containing unusually high concentrations of the insecticide endrin in emulsion concentrates which are stable at low temperatures and have other unique advantages. Our invention also relates to the novel method of preparing these new concentrate compositions.

Endrin is one of a number of important insecticides, which chemically are chlorinated organic compounds, which have been developed in recent years and which have been widely used for the control of insect pests which cause extensive and economically significant damage to crops and beneficial animal life. The name endrin applies to the pure chemical 1,2,3,4,4,10,10-hexachloro-6,7-epoxy-1,4,4a,5,6,7,8,8a-octahydro-1,4,5,8-endo - endo-dimethanonaphthalene (see the release by H. L. Haller and J. W. Simmons dated June 4, 1952, from the Interdepartmental Committee on Pest Control, U.S. Department of Agriculture and U.S. Public Health Service). Pure endrin is a white crystalline solid which melts with gradual chemical rearrangement when heated above 200° C. Technical endrin as used herein is the name given to commercial endrin consisting preponderantly of endrin, the remainder being related compounds arising during the manufacturing process. The most common concentration of endrin in technical endrin is about 95%. Technical endrin is a powdery crystalline solid which rearranges when heated above 392° F., has a vapor pressure of $2 \times 10^{-7}$ mm. Hg at 77° F., and a density of 14.6 pounds per gallon at 68° F.

When endrin is to be applied in actual practice for insect control, it is first formulated in a variety of ways known to the art, such as in dusts, wettable powders, emulsifiable concentrates, oil solutions, and the like. This invention is particularly directed toward the obtaining of emulsion concentrates with unique and advantageous properties.

In present practice an emulsifiable concentrate of endrin which contains the equivalent of 1.6 pounds of endrin per gallon of the finished concentrate is prepared by dissolving 20.9 pounds of technical endrin, which assays 95% endrin, in 71.6 pounds of xylene and adding 7.5 pounds of an emulsifying agent. This emulsifiable concentrate is then mixed with an appropriate quantity of water in the field to give an emulsion containing the desired amount of endrin to be applied to the focus of actual or possible insect infestation.

While such a concentrate will form satisfactory emulsions, it has several serious disadvantages. The cost of preparing large-scale formulations which contain as much as 7.5% of expensive emulsifying agents, as in the example given above, is great. In addition, the cost is increased by the need of having the solvent phase consist entirely of an organic solvent, which makes up more than 70% of the weight of the concentrate described above.

More important, however, is the hazard involved in having such a large amount of solvent present in the formulation. Thus, when the solvent is xylene, for example, the flash point of the concentrate is low and great care must be taken during the preparation, shipment, storage, and use of the concentrate to prevent injury to workers from accidental fire or explosion. Further, since it is recognized that the toxicity to human beings of vapors of such organic solvents as xylene is great, the large amounts of these solvents in the insecticide concentrate are a further hazard. Similarly, large amounts of organic solvents present in an endrin formulation increase the risk of phytotoxicity when it is applied to crops for insect control.

A further and serious difficulty in the preparation and use of emulsifiable concentrates containing only endrin, a solvent, and an emulsifying agent is the limit in the amount of endrin which can be held in the concentrate in a continuously stable and homogeneous manner while the concentrate is subjected to low temperatures in shipment and during storage.

Thus in the past it has been impossible to prepare satisfactory emulsifiable concentrates of endrin containing, for example, as much as 4 pounds of endrin per gallon of concentrate, since on exposure to low temperatures in shipment and during storage some of the endrin separates from the concentrate, making it nonhomogeneous and less suitable for use.

Although concentrates containing 4 pounds of endrin per gallon of concentrate may be stable and homogeneous when they are first prepared at room temperature in the usual manner, there is no assurance that these concentrates will remain in this state until ready for use. Exposure to temperatures only as low as about 50° F., for example, often causes some of the endrin to crystallize out from the concentrate, or the insecticide and solvent may separate into layers. Since the concentrates are shipped in sealed drums or tank cars, it is unlikely that the user will be able to determine readily if the concentrate is in a homogeneous state, ready for dilution to the proper concentration for use. Further, even if the lack of homogeneity were noted, time-consuming effort and the use of separate and special mixing apparatus would be required by the user to reblend the concentrate again to a homogeneous state.

We have now prepared endrin concentrate compositions which contain as much as about 5 pounds of endrin per gallon of concentrate and which are stable at low temperatures, but which nevertheless require lesser quantities of organic solvents and emulsifying agents. These new concentrate compositions of our invention thus have a number of marked advantages compared to presently known concentrates. The ability to incorporate larger quantities of endrin in a given volume of concentrate provides economies in the preparation, shipment, and use of the concentrates. The ability of the concentrates to withstand low temperatures while still remaining stable and homogeneous is a great advantage, as we have discussed above. The reduced amounts of emulsifying agents which are required as well as the reduced amounts of organic solvents necessary to prepare desirable concentrates are economic advantages. The decreased amounts of organic solvents, as well as the use of water in the compositions of our invention, greatly reduce the hazards to human beings from fire, explosion, and vapor toxicity, as well as reducing the danger of phytotoxic effects.

The endrin emulsion concentrates of our invention are readily usable in the ways commonly recognized in the art of insecticide application. Thus, for example, they can simply be diluted with any desired amount of water until the desired concentration of endrin is attained, whereupon the resulting aqueous liquids are sprayed directly on the crops or areas which it is desired to treat for insect control.

The compositions of our invention are prepared by the technique of first making a mixture, which we shall designate as A, of diethylene glycol and a dispersing agent in water. The mixture A is agitated vigorously and to it is added a mixture, which we shall designate as B, which has been made by dissolving the endrin in an organic solvent with the aid of heat and adding to it an emulsifying agent. As we shall discuss fully below, the use of diethylene glycol and a dispersing agent is not absolutely essential to the preparation of the endrin emulsion concentrates of our invention. Hence, when they are not used, the component A will consist entirely of water. The temperature at which the components A and B are combined is not critical, but it is essential that the component A be agitated vigorously during such mixing.

The proportions of the components in the compositions of our invention are such that the finished concentrate contains from about 2 to about 5 pounds of endrin per gallon of concentrate. Thus, to obtain a concentrate which contains 5 pounds of endrin per gallon of concentrate, we use 5.27 pounds of technical endrin which assays 95% by weight endrin. Although useful endrin emulsion concentrates are made to contain from about 2 to about 5 pounds of endrin per gallon of concentrate, a preferred range of endrin concentration is from about 2.5 to about 4.5 pounds per gallon. Further, we have found that a most preferred range of endrin concentration is from about 3 to about 4 pounds per gallon.

The amount of emulsifying agent required to prepare the novel concentrate compositions of our invention is from about 1% to about 5% by weight of the finished composition. The actual amount of emulsifying agent most suitable for a particular formulation varies with the concentration at which the endrin is to be formulated, the physical characteristics of the organic solvent which is selected, the amount of water which is employed to make up the continuous phase of the emulsion, the emulsifying power of the particular emulsifier which is used, and other factors. While a concentration range of from about 1% to about 5% by weight of the finished concentrate is satisfactory for the emulsifying agent in the compositions of our invention, we have found that a preferred emulsifier concentration range is from about 2% to about 4%, while a most preferred concentration range is from about 2.5% to about 3.5%.

Emulsifying agents which are ordinarily used in the art of formulating insecticides are suitable for preparing the endrin emulsion concentrates of our invention. Examples of typical commercially available emulsifiers which are useful in our emulsion concentrates are: Emulphor EL–719, a polyoxyethylated vegetable oil emulsifier supplied by the Antara Chemicals Division of the General Aniline and Film Corp.; Renex 690, a polyoxyethylene nonylphenol emulsifier supplied by the Atlas Powder Co.; J–300, a polyoxyethylated tall oil emulsifier supplied by the Blockson Chemical Co. Division of the Olin Mathieson Corp.; Emulphor EL–620, a polyoxyethylated vegetable oil emusifier supplied by Antara Chemicals; Orvus K, a modified alkyl sulfate emulsifier supplied by the Procter & Gamble Co.; Sipon L–22, an ammonium salt of lauryl alcohol sulfate supplied by the American Alcolac Corp.; Nonic 260, a polyethylene glycol tertdodecyl thioether supplied by Sharples Chemicals, Inc.; a division of the Pennsylvania Salt Manufacturing Co.; Ninol 128, a fatty acid alkanolamide supplied by Ninol Laboratories, Inc.; Igepal CO–630, a nonyl phenoxy polyoxyethylene ethanol supplied by Antara Chemicals; J–400, a nonyl phenoxy polyoxyethylene ethanol supplied by the Blockson Chemical Co., and the like. The selection of particular emulsifiers, the quantities, and the particular manner in which they can be used in our invention are illustrated in the examples which form a part of this application.

The amount of water which is employed in making up the continuous phase in the endrin emulsion concentrates of our invention can vary from about 5% to about 20% by weight of the finished composition. Large amounts of water can be used, for example, where it is desired to reduce hazards from explosion and flammability to a minimum. Although a water concentration range of from about 5% to about 20% by weight of the finished composition is satisfactory for preparing our endrin emulsion concentrates, we have found that a preferred range of concentration is from about 8% to about 17% by weight, while a most preferred range is from about 10% to about 15%.

The dispersing agent can be present in our compositions in concentrations of from 0% to about 2% by weight of the finished concentrate. The purpose of the dispersing agent is to decrease the viscosity of the emulsion concentrate in cases where the physical properties as well as the quantities of other components used are such that the viscosity of the concentrate would otherwise be higher than preferred. Thus it is evident that the presence of a dispersing agent is not necessary to produce satisfactory compositions according to our invention.

Dispersing agents such as are commonly used in the art of surfactant technology can be used in preparing our endrin emulsion concentrates. Where a cationic or an anionic emulsifier has been selected for the formulation, a dispersing agent of the same polar character is used. Where a nonionic emulsifier has been selected, either cationic or anionic dispersing agents are satisfactory. Examples of typical commercially available dispersing agents which are useful in our emulsion concentrates are: Tamol N, a sodium salt of a sulfonated naphthalene condensate supplied by the Rohm and Haas Co.; Marasperse N, a sodium lignosulfonate supplied by the Marathan Corp.; Altrosperse 40K, an alkyl naphthalene sodium sulfonate supplied by the Geigy Chemical Co.; Polyfon F, a sodium lignosulfonate supplied by the West Virginia Pulp and Paper Co.; Darvan No. 2, a sodium salt of polymerized alkyl aryl sulfonic acid supplied by the Dewey and Almy Chemical Co.; Blancol N, a sodium salt of a sulfonated naphthalene supplied by the Antara Chemicals Division of General Aniline and Film Corp.; Lignosite, salts of lignosulfonic acid supplied by the Puget Sound Pulp and Timber Co.; Lomar PW, a sodium salt of a condensed mononaphthalene sulfonic acid supplied by Jacques Wolf and Co.; Stablex B, a sodium naphthalene sulfonate supplied by the Heveatex Corp.; Tamol 731, a sodium salt of a carboxylated polyelectrolyte supplied by the Rohm and Haas Co. The use of particular dispersing agents, as well as the quantity and manner in which they are employed, will be evident from the examples which form a part of this application.

The purpose of the diethylene glycol, which can be used in our compositions at a concentration range of from 0% to about 10% by weight of finished concentrate, is to increase the stability of our concentrates to low temperatures. Thus, while concentrates prepared according to our invention but not containing any diethylene glycol are themselves stable at temperatures of about 32° F., or lower, concentrates which are stable at temperatures as low as about 0° F. can be made according to our invention by the incorporation of up to about 10% by weight of diethylene glycol.

When the quantities of endrin, emulsifier, water, dispersing agent, and diethylene glycol have been selected as desired to prepare the compositions of our invention, sufficient organic solvent is incorporated to bring the total concentration of all the components to 100%. Thus, a typical concentrate which will contain the equivalent per gallon of concentrate of about 4 pounds of endrin will consist, on a weight basis, of 44.0% technical endrin (assay 95% endrin), 3.0% emulsifier, 0.5% dispersing agent, 5.0% diethylene glycol, 11.0% water, and 36.5% organic solvent.

The solvents which are suitable for the preparation of the endrin emulsion concentrates of our invention are aromatic hydrocarbons which are normally liquid at room temperature, have boiling points in the range from about 175° F. to about 400° F., are good solvents for endrin, and are immiscible with water. Preferred solvents for our compositions are common insecticide solvents such as benzene, toluene, xylene, and chemically related commercially available solvents. Examples of the latter are: Espersol 5 (supplied by the Eastern States Chemical Corp.), which has a boiling range of 282–330° F., a specific gravity at 60/60° F. of 0.843, an aniline point of 72.5, and a kauri-butanol value of 85; Hi Solv 30 (supplied by the Pennsylvania Industrial Chemical Corp.), which has a boiling range of 266–274° F., a S.G. at 60/60° F. of 0.840, and an aniline point of 82; Amsco Solvent B (supplied by the American Mineral Spirits Co.), which has a boiling range of 280–298° F., a S.G. at 60/60° F. of 0.850, an aniline point of 65, and a kauri-butanol value of 84.

The manner in which typical compositions of our invention are prepared is illustrated in the following examples:

EXAMPLE 1

*Preparation of a 4-Pound Endrin Concentrate*

Technical grade endrin (44.0 g.), which assayed 95% endrin, was placed in a beaker with 33.0 g. xylene and was stirred and heated over an electric hot plate until a clear solution was obtained. Antara Chemicals Emulsifier, Emulphor EL–719 (3.0 g.), was added with stirring until a homogeneous mixture was obtained. In a separate beaker, a mixture was prepared from 13.65 g. water, 5.85 g. diethylene glycol, and 0.5 g. of Rohm and Haas Co.'s Tamol N. While the aqueous mixture was stirred with a mechanical stirrer at about 400 to 500 revolutions per minute, the insecticide mixture was added slowly in a steady stream. The finished concentrate prepared in this manner contained the equivalent of about 4 pounds of endrin per gallon of concentrate.

EXAMPLE 2

*Preparation of a 4-Pound Endrin Concentrate on a Large Scale*

Technical endrin (22.0 pounds), which assayed 95% endrin, was placed with 16.5 pounds xylene in a mixing kettle fitted with a mechanical stirrer and a jacket for heating with steam. Steam was passed through the heating jacket, and the mixture was heated and stirred until a clear solution was obtained. Emulphor EL–719 emulsifier (1.50 pounds) was added with stirring until a homogeneous mixture was obtained. In another kettle fitted with a mechanical stirrer (propeller type blade), a mixture was made from 6.83 pounds water, 2.92 pounds diethylene glycol, and 0.25 pounds of Tamol N dispersing agent. While the aqueous mixture was stirred vigorously, the hot insecticide mixture was metered into it. The resulting concentrate when thoroughly blended by mixing for 3 to 5 minutes contained about 4 pounds of endrin per gallon of concentrate.

EXAMPLE 3

*Preparation of an Endrin Concentrate Without Glycol or Dispersing Agent*

In a manner similar to that described in Example 2, a 4-pound endrin concentrate was prepared from 22.0 pounds technical endrin (assay 95% endrin), 16.75 pounds xylene, 1.5 pounds emulsifier EL–719, and 9.75 pounds water.

EXAMPLE 4

*Preparation of an Endrin Concentrate Without Dispersing Agent*

In a manner similar to that described in Example 2, a 4-pound endrin concentrate was prepared from 22.0 pounds technical endrin (assay 95% endrin), 16.75 pounds xylene, 1.5 pound emulsifier EL–719, 6.83 pounds water, and 2.92 pounds diethylene glycol.

EXAMPLE 5

*Preparation of a 2-Pound Endrin Concentrate*

In a manner similar to that described in Example 1, an emulsion concentrate containing the equivalent of about 2 pounds of endrin per gallon of concentrate is prepared from 22.0 g. technical endrin (assay 95% endrin), 1.0 g. Blockson J–300 emulsifier, 2.0 g. Marasperse dispersing agent, 20.0 g. water, and 55.0 g. Espersol 5 solvent.

EXAMPLE 6

*Preparation of a 5-Pound Endrin Concentrate*

As described in Example 1, an emulsion concentrate containing the equivalent of about 5 pounds of endrin per gallon of concentrate is prepared from 55.0 g. technical endrin (assay 95% endrin), 5.0 g. Blockson J–400 emulsifier, 7.5 g. diethylene glycol, 5.0 g. water, and 27.5 g. Hi Solv 30 solvent.

EXAMPLE 7

*Preparation of an Endrin Concentrate With Toluene*

In a manner similar to that described in Example 1, an emulsion concentrate which contains the equivalent of about 2.5 pounds of endrin per gallon of concentrate is made from 27.5 g. technical endrin (assay 95% endrin), 2.0 g. Antara EL–620 emulsifier, 1.0 g. Polyfon F dispersing agent, 17.0 g. water, and 52.5 g. toluene.

EXAMPLE 8

*Preparation of an Endrin Concentrate With a High Glycol Content*

As described in Example 1, an emulsion concentrate which contains the equivalent of about 4.5 pounds of endrin per gallon of concentrate is made from 49.5 g. technical endrin (assay 95% endrin), 4.0 g. EL–620 emulsifier, 10.0 g. diethylene glycol, 8.0 g. water, and 28.5 g. Amsco Solvent B.

EXAMPLE 9

*Preparation of an Endrin Concentrate With a Low Water Content*

In a manner similar to that described in Example 1, an emulsion concentrate containing the equivalent of about 3.0 pounds of endrin per gallon of concentrate is prepared from 33.0 g. technical endrin (assay 95% endrin), 2.5 g. EL–620 emulsifier, 5.0 g. water, and 59.5 g. Amsco Solvent B.

EXAMPLE 10

*Preparation of an Endrin Concentrate With 10% Water*

In a manner similar to that described in Example 1, an emulsion concentrate containing the equivalent of about 4 pounds endrin per gallon of concentrate was prepared from 44.0 g. technical endrin (assay 95% endrin), 36.5 g. xylene, 3.0 g. EL–719 emulsifier, 0.5 g. Tamol N, 5.0 g. diethylene glycol, and 11.0 g. water.

The stability of the compositions of this invention when subjected to low temperatures was demonstrated in tests carried out with samples of the compositions prepared as described in Examples 1 through 10. These concentrates were placed in cold chambers at various temperatures and were observed daily for any changes in their homogeneity. At the end of a week, when the test was concluded, there was no evidence of crystallization, separation of the components in layers, or lack of homogeneity in any form in the compositions containing diethylene glycol, which were stored at 0° F., or in any of the compositions not containing diethylene glycol, which were stored at 32° F. Thus it is seen that the compositions of our invention are stable at temperatures of 32° F. or lower. Further, tests with samples of the products from Examples 1 through 10 placed in ovens have shown that they are stable at high temperatures (122° F.) as well. Thus the endrin emulsion concentrates of our invention can be shipped, stored, and used without the difficulties which normally arise from extremes in temperatures.

We claim:

1. A stable insecticide concentrate composition comprising endrin, an aromatic solvent for said endrin, water, and an emulsifying agent, said composition being an emulsion with the water constituting its continuous phase, wherein the endrin comprises from about 2 to about 5 pounds per gallon composition, the aromatic solvent is a liquid hydrocarbon boiling in the range from about 175° to about 400° F., and the water content is from about 5 to about 20% and the emulsifying agent from about 1 to about 5% by weight of the composition.

2. The composition of claim 1 additionally containing up to about 10% diethylene glycol and up to about 2% of a compatible viscosity reducing dispersing agent by weight of the composition.

3. An aqueous insecticide emulsion concentrate wherein water is in the external phase, said emulsion being stable at temperatures as low as about 0° F., and containing about four pounds endrin per gallon composition, said endrin being dissolved in xylene, and said composition further containing by weight about 11% water, about 3% emulsifying agent, about 5% diethylene glycol, and about 0.5% dispersing agent.

4. A process for the preparation of an insecticide concentrate composition stable at temperatures as low as about 32° F., which comprises adding a mixture comprising endrin in an amount to provide the concentrate composition with from about two to about five pounds of endrin per gallon of concentrate composition, dissolved in a liquid aromatic hydrocarbon solvent boiling in the range from about 175° F. to about 400° F., and an emulsifying agent in an amount to provide the concentrate composition with from about 1 to about 5% by weight emulsifying agent, to water comprising from about 5 to about 20% of the concentrate composition, with vigorous stirring to form an emulsion with water constituting its continuous phase.

5. A process for the preparation of a stable insecticide concentrate composition, which comprises adding a mixture of technical endrin in an amount to provide the concentrate composition with from about two to about five pounds of endrin per gallon of concentrate composition dissolved in a liquid aromatic hydrocarbon solvent boiling in the range from about 175 to about 400° F. and an emulsifying agent in an amount to provide the concentrate composition with from about 1 to about 5% by weight emulsifying agent, to a mixture of diethylene glycol comprising from about 0.01 to about 10% by weight of the concentrate composition, a dispersing agent comprising from about 0.01 to about 2% by weight of the concentrate composition, and water comprising from about 5 to about 20% by weight of the concentrate composition, with vigorous stirring to form an emulsion with water constituting its continuous phase.

6. A process for the preparation of a stable insecticide concentrate composition which comprises dissolving technical endrin with the aid of heat in a liquid aromatic hydrocarbon solvent boiling in the range of from about 175 to about 400° F. in an amount to provide the composition with two to about five pounds of endrin per gallon of concentrate composition, mixing therewith emulsification agent in an amount to provide the concentrate composition with from about 1 to about 5% by weight emulsification agent, and stirring vigorously with water comprising from about 5 to about 20% by weight of the concentrate composition, to form an emulsion with water constituting its external phase.

7. The process of claim 6 wherein diethylene glycol and a viscosity controlling dispersing agent are added to the water prior to said emulsification, and wherein said diethylene glycol is added in an amount to provide the composition with from about 0.01 to about 10% by weight diethylene glycol, and wherein said dispersing agent is added in an amount to provide the composition with from about 0.01 to about 2% by weight dispersing agent.

References Cited in the file of this patent

UNITED STATES PATENTS

| | | |
|---|---|---|
| 2,676,132 | Bluestone | Apr. 20, 1954 |
| 2,875,119 | Trademan et al. | Feb. 24, 1959 |

OTHER REFERENCES

Shell, Handbook of Aldrin, Dieldrin and Endrin Formulations, pages 11, 12, 61–63 and 65–69, December 1954.

Glycols, Carbide and Carbon Chem. Corp., pages 3 to 5, March 31, 1947.

Schwartz et al.: Surface Active Agents, vol. I, pages 116–117, 1949.

Prince, Pests, pp. 18 and 20, July 1948.

Lidov, Soap and Sanitary Chemicals, pp. 137–9, vol. 24, January–June 1948.

Frear, Chemistry of Insecticides, Fungicides and Herbicides, 2nd ed. (1948), pp. 67, 277–289.